UNITED STATES PATENT OFFICE.

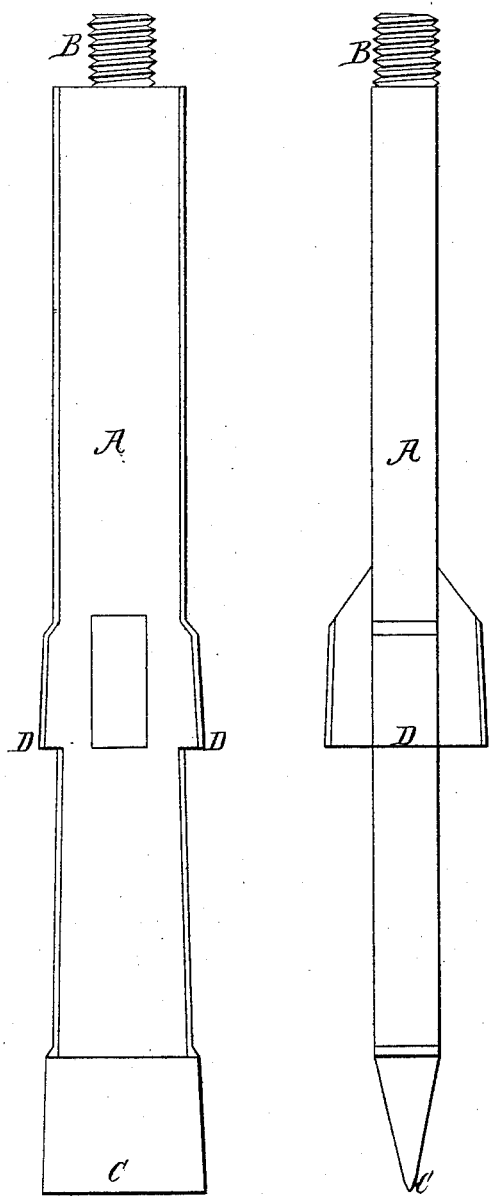

DAVID EVANS, OF PHILADELPHIA, PENNSYLVANIA.

IMPROVED ROCK-DRILL.

Specification forming part of Letters Patent No. 45,147, dated November 22, 1864.

*To all whom it may concern:*

Be it known that I, DAVID EVANS, of the city and county of Philadelphia, State of Pennsylvania, have invented a new and useful Improvement in Rock-Drills; and I do hereby declare that the following specification, with the accompanying drawings, is sufficient to enable any person skilled in the art or science to which it most nearly appertains to make and use my said invention or improvements without further invention or experiment.

In the present mode of boring Artesian wells for oil or water great practical inconvenience is experienced in consequence of the wearing away of the sides or corners of the drill, so that it makes a hole gradually smaller as the drill wears away, making it necessary to withdraw the drill once in about every two feet bored and insert a reamer to bore or make the hole of a uniform size, thereby taking about twice as much time to bore a well of a given depth as it would take if the drill was so constructed as to make the hole of a uniform size at the same time that it is bored.

The design and object of my invention is to make a drill that will cut or bore a hole so nearly uniform in size that it will require very little, if any, reaming, and thus save about one-half of the time and labor heretofore required to bore a well. To effect this I make some permanent projecting cheeks or cutters on the sides of the drill a short distance from the point to cut or ream the hole drilled as the corners or sides of the drill wear away.

The nature of my invention and improvement consists in providing a rock-drill with permanent cheeks or cutters a short distance from the point of the drill to cut or ream the hole drilled of a uniform size as the point of the drill wears away in drilling.

To enable others skilled in the art to make and use my invention, I will proceed to describe its construction, referring to the accompanying drawings, in which the same letters indicate like parts in each of the figures.

Figure 1 is an elevation of one side of my drill. Fig. 2 is an elevation of one edge.

In these drawings, A is the shaft of the drill, provided with a screw-thread, B, at its upper end, by which it is connected to the drill-rod used to operate it.

The point C of the drill may be made in the form shown in the drawings, or in such other form as will answer the purpose, and at a short distance from the point I make two projecting cheeks or cutters, D D, of steel, by welding it onto the shaft of the drill, or by making the drill of steel from the point to a little above the cheek-cutters. I think, however, it may be best to make the shaft of the drill of iron and weld on a steel point and cheeks, so that the point and cheeks can be tempered without hardening the shaft between the point and cheeks, which might render it liable to break if made of steel. I have only shown one projection or cutter, D, on each edge of the drill; but I contemplate there may be two or more on each edge, one above the other, or that there may be some additional cutters on the sides of the drill, as shown at E E, to aid in cutting the hole uniform in size as the drill wears away.

I claim—

Providing a rock-drill with permanent cheeks or cutters a short distance from the point of the drill to cut or ream the hole drilled of a uniform size as the point of the drill wears away in drilling.

DAVID EVANS.

Witnesses:
JOHN WHITE,
JOHN F. CARR.